(12) United States Patent
Nelson

(10) Patent No.: US 7,299,203 B1
(45) Date of Patent: Nov. 20, 2007

(54) METHOD FOR STORING AND SHIPPING PROGRAMMABLE ASSP DEVICES

(75) Inventor: Michael D. Nelson, Mountain View, CA (US)

(73) Assignee: Xilinx, Inc., San Jose, CA (US)

(*) Notice: Subject to any disclaimer, the term of this patent is extended or adjusted under 35 U.S.C. 154(b) by 825 days.

(21) Appl. No.: 09/839,041

(22) Filed: Apr. 19, 2001

(51) Int. Cl.
G06Q 10/00 (2006.01)

(52) U.S. Cl. .............................. 705/28; 705/1; 705/26; 700/121; 710/305; 713/121; 713/187; 713/193; 716/17; 726/26

(58) Field of Classification Search .................. 705/28
See application file for complete search history.

(56) References Cited

U.S. PATENT DOCUMENTS

| | | | | |
|---|---|---|---|---|
| 4,408,291 A | * | 10/1983 | Gunzberg et al. | 700/115 |
| 4,527,115 A | * | 7/1985 | Mehrotra et al. | 714/725 |
| 4,641,108 A | * | 2/1987 | Gill, Jr. | 330/307 |
| 4,691,161 A | * | 9/1987 | Kant et al. | 714/726 |
| 4,987,578 A | * | 1/1991 | Akins et al. | 375/377 |
| 5,084,843 A | * | 1/1992 | Mitsuishi et al. | 365/218 |
| 5,217,916 A | * | 6/1993 | Anderson et al. | 438/128 |
| 5,268,838 A | * | 12/1993 | Ito | 700/99 |
| 5,350,704 A | * | 9/1994 | Anderson et al. | 438/129 |
| 5,360,992 A | * | 11/1994 | Lowrey et al. | 257/666 |
| 5,367,187 A | * | 11/1994 | Yuen | 257/401 |
| 5,393,965 A | * | 2/1995 | Bravman et al. | 235/383 |
| 5,451,801 A | * | 9/1995 | Anderson et al. | 257/202 |
| 5,457,659 A | * | 10/1995 | Schaefer | 365/222 |
| 5,459,340 A | * | 10/1995 | Anderson et al. | 257/203 |
| 5,541,848 A | * | 7/1996 | McCormack et al. | 700/213 |
| 5,596,282 A | * | 1/1997 | Giddings et al. | 324/754 |
| 5,657,453 A | * | 8/1997 | Taoka et al. | 705/1 |
| 5,731,230 A | * | 3/1998 | Nevill et al. | 438/15 |
| 5,763,907 A | * | 6/1998 | Dallavalle et al. | 257/202 |
| 5,765,143 A | * | 6/1998 | Sheldon et al. | 705/28 |
| 5,787,174 A | * | 7/1998 | Tuttle | 713/189 |
| 5,788,855 A | * | 8/1998 | Landolf | 216/13 |

(Continued)

FOREIGN PATENT DOCUMENTS

WO   WO 01/08411   *   2/2001

(Continued)

OTHER PUBLICATIONS

White, Ron, How Computers Work, Millennium Ed. Que Corporation, Sep. 1999.*

(Continued)

Primary Examiner—Ryan Zeender
Assistant Examiner—Asfand M Sheikh
(74) Attorney, Agent, or Firm—Michael R. Casey; LeRoy D. Maunu

(57) ABSTRACT

A novel method for order processing, manufacturing and distributing integrated circuits (ICs) including the steps of: dry packing a plurality of programmable ICs and placing the dry packed programmable ICs into inventory such that the inventory is re-accessible in an automated manner. A plurality of configuration programs are stored and in response to orders from customers, a subset of the inventoried ICs are unpacked in order to process the order. The process then includes the steps of programming the unpacked ICs with a configuration selected by the customer and re-packing the programmed ICs for shipment.

14 Claims, 8 Drawing Sheets

U.S. PATENT DOCUMENTS

| | | | | |
|---|---|---|---|---|
| 5,884,300 | A * | 3/1999 | Brockman | 707/2 |
| 5,915,017 | A * | 6/1999 | Sung et al. | 713/187 |
| 5,946,552 | A * | 8/1999 | Bird et al. | 438/107 |
| 5,949,719 | A * | 9/1999 | Clinton et al. | 365/189.01 |
| 6,018,686 | A * | 1/2000 | Orso et al. | 700/121 |
| 6,020,633 | A | 2/2000 | Erickson | |
| 6,021,904 | A * | 2/2000 | Kozol et al. | 206/724 |
| 6,044,025 | A | 3/2000 | Lawman | |
| 6,052,319 | A * | 4/2000 | Jacobs | 365/201 |
| 6,116,423 | A * | 9/2000 | Troxtell et al. | 206/523 |
| 6,148,279 | A * | 11/2000 | Jacobs | 703/27 |
| 6,167,383 | A * | 12/2000 | Henson | 705/26 |
| 6,175,951 | B1 * | 1/2001 | Shyu | 716/17 |
| 6,212,639 | B1 * | 4/2001 | Erickson et al. | 726/26 |
| 6,225,818 | B1 * | 5/2001 | Park et al. | 324/763 |
| 6,324,522 | B2 * | 11/2001 | Peterson et al. | 705/28 |
| 6,345,259 | B1 * | 2/2002 | Sandoval | 705/7 |
| 6,359,248 | B1 | 3/2002 | Mardi | |
| 6,421,287 | B1 * | 7/2002 | Jacobs | 365/201 |
| 6,434,264 | B1 * | 8/2002 | Asar | 382/147 |
| 6,449,523 | B1 * | 9/2002 | Johnson et al. | 700/121 |
| 6,467,009 | B1 * | 10/2002 | Winegarden et al. | 710/305 |
| 6,601,043 | B1 * | 7/2003 | Purcell | 705/26 |
| 6,605,960 | B2 * | 8/2003 | Veenstra et al. | 326/38 |
| 6,657,426 | B1 * | 12/2003 | Powell et al. | 324/158.1 |
| 6,725,375 | B2 * | 4/2004 | Fujioka | 713/191 |
| 6,732,853 | B1 * | 5/2004 | Bolotin | 198/468.2 |
| 6,772,230 | B2 * | 8/2004 | Chen et al. | 710/8 |
| 6,823,226 | B2 * | 11/2004 | Clemens et al. | 700/99 |
| 6,871,110 | B1 * | 3/2005 | Yen et al. | 700/100 |
| 6,912,510 | B1 * | 6/2005 | Shepherd | 705/37 |
| 6,915,253 | B1 * | 7/2005 | Chapman | 703/22 |
| 6,939,747 | B1 * | 9/2005 | Lin | 438/130 |
| 6,990,387 | B1 * | 1/2006 | Freij et al. | 700/121 |
| 6,990,464 | B1 * | 1/2006 | Pirillo | 705/26 |
| 7,024,653 | B1 * | 4/2006 | Moore et al. | 716/16 |
| 7,240,218 | B2 * | 7/2007 | Kean | 713/193 |
| 2001/0032111 | A1 * | 10/2001 | Jensen et al. | 705/8 |
| 2001/0037341 | A1 * | 11/2001 | Kimoto et al. | 707/104.1 |
| 2002/0007293 | A1 * | 1/2002 | Clemens et al. | 705/7 |
| 2002/0022969 | A1 * | 2/2002 | Berg et al. | 705/1 |
| 2002/0186045 | A1 * | 12/2002 | Cox | 326/41 |
| 2003/0172364 | A1 * | 9/2003 | Lin | 716/17 |
| 2005/0108101 | A1 * | 5/2005 | Hsu et al. | 705/26 |
| 2005/0251586 | A1 * | 11/2005 | Lin | 710/1 |
| 2005/0256779 | A1 * | 11/2005 | Ni et al. | 705/26 |

FOREIGN PATENT DOCUMENTS

WO      WO 01/08411 A1 *    2/2001

OTHER PUBLICATIONS

Derfler, Frank J. et. al. How Networks Work, Millennium Ed., Que Corporation, Jan. 2000.*

Gralla, Preston, How the Internet Works, Millennium Ed., Que Corporation, Aug. 1999.*

Greene, James H, Editor-in-Chief, Production and Inventory Control Handbook, 3rd Ed., McGraw-Hill Companies, Inc., 1997.*

Dobler, Donald W. and Burt, David N., Purchasing and Supply Management, Text & Cases, 6th Ed., The McGraw-Hill Companies, Inc., 1996.*

Bragg, Steven M., Accounting Best Practices, John Wiley and Sons, Inc., 1999.*

Chopra, Sunil, and Meindl, Peter; Supply Chain Management, Strategy, Planning, & Operation, Prentice-Hall, Inc., Oct. 10, 2000.*

Xilinx, "The Programmable Logic Data Book", 1996, available from Xilinx, Inc., 2100 Logic Drive, San Jose, California 95124, pp. 13-25 through 13-32.

* cited by examiner

METHOD FOR STORING AND SHIPPING PROGRAMMABLE ASSP DEVICES

BACKGROUND OF THE INVENTION

1. Field of the Invention

This invention relates generally to the manufacturing and distribution of application specific standard product (ASSP) integrated circuits (ICs) including, but not limited to, the manufacturing and distribution of field programmable gate arrays (FPGA).

2. Discussion of the Background

IC fabrication often concludes with the steps of testing, packaging, marking, and dry packing of the IC. Typically, an IC device is tested briefly while still on the wafer. ICs failing this test are discarded. ICs passing the test are packaged (i.e., mounted in plastic or ceramic carriers that protect the IC.) Packaged ICs are then marked (e.g., with product tracking information and other appropriate markings). Packaged ICs that have been marked are then subjected to further tests to determine full functionality and performance. ICs failing these tests are discarded.

Often the fully tested and marked ICs are then dry packed. That is, the ICs are processed to remove residual moisture, usually through baking, and hermetically sealed, typically in vacuum sealed anti-static envelopes.

Conventional ASSP ICs are pre-programmed at the factory to perform a specific function. They have fixed capabilities and are homogenous.

In contradistinction thereto, an FPGA is a programmable IC logic device that includes a matrix of configurable logic blocks (CLBS) embedded in a programmable routing mesh. Thus, an FPGA can be considered a programmable ASSP device and can be programmed after manufacturing. (The device is referred to as an FPGA because the array of CLBs contained on the device can be configured and interconnected in the "field" by the user (as opposed to the manufacturer) by means of special hardware and software.) The combined programming of the CLBs and routing network define the function of the device.

Each CLB can provide one or more of the functions provided by an AND gate, OR gate, flip-flop, latch, inverter, NOR gate, exclusive OR gate, as well as combinations of these functions to form more complex functions. The particular function performed by any one CLB is determined by control signals that are applied thereto from a corresponding control logic circuit. The control logic circuit is formed integrally with, and is part of, the integrated circuit on which the CLB is formed. If desired, control information can be stored and/or generated outside of this integrated circuit and transmitted to the CLB. The actual set of control bits provided to each CLB on the IC depends upon the functions that the CLB and, more globally, the IC are to perform.

Each CLB typically has a plurality of input and output pins, and a set of programmable interconnect points (PIPs) for each input and output pin. The general interconnect structure of the FPGA includes a plurality of interconnect segments and a plurality of PIPs, wherein each interconnect segment is connected to one or more other interconnect segments by programming an associated PIP. An FPGA also includes an access PIP that either connects an interconnect segment to an input pin or an output pin of the CLB.

Because the PIPs in the FPGA are programmable, any given output pin of a CLB is connectable to any given input pin of any other desired CLB. Thus, a specific FPGA configuration having a desired function is created by selected generation of control signals to configure the specific function of each CLB in an FPGA, together with selected generation of control signals to configure the various PIPs that interconnect the CLBs within the FPGA. The configuration data may be read from memory (e.g., an external programmable read-only memory (PROM)) or written into the FPGA by an external device. U.S. Pat. No. 6,020,633 to Erickson and U.S. Pat. No. 6,044,025 to Lawman describe the relationship between the PROM and the FPGA and are incorporated herein by reference.

SUMMARY OF THE INVENTION

An object of the invention is to provide a novel method for manufacturing and distributing programmable ICs.

Another object of the invention is to provide a novel computerized method for processing an order for programmable ICs.

Yet another object of the invention is to provide a novel method for incorporating security technologies into an IC including an FPGA.

A novel method for manufacturing and distributing ICs that addresses at least one of the above-objects includes the steps of: dry packing a plurality of programmable ICs; placing the dry packed programmable ICs into inventory such that the inventory is re-accessible in an automated manner; unpacking a subset of the inventoried ICs in order to process an order; programming the unpacked ICs; testing the programmed ICs for functionality and/or performance compliance; further labeling the programmed ICs with program (and potentially test results) specific information; and re-packing the programmed ICs for shipment.

According to another aspect of the invention, the method includes the steps of: storing a plurality of configuration programs; pulling specified volumes of un-programmed ICs from inventory in response to an order from a customer; programming the specified volumes of ICs with a configuration selected by the customer; and packing the programmed ICs for shipment.

Yet another aspect of the invention is the incorporation of methods to encrypt the configuration program for security purposes. In one such embodiment the IC program would be encrypted prior to storage in the IC using keys specific to the configuration. The necessary keys would be stored in the device too, but in an externally WRITE ONLY memory space. Such ICs would initialize, decrypt the program through embedded circuitry using the internally readable keys, and then be configured for its intended application.

Other embodiments featuring even higher security are implemented by leveraging the partial configurability/reconfigurability of FPGAs to utilize a configuration or vendor specific encryption/decryption technique. In such embodiments a separate decryption program would be loaded into the IC in a manner similar to the base program. Such programs would load and run solely for the purpose of decrypting and initializing the primary program in the IC.

In the manner described above, the present invention enables intellectual property (IP) solutions to be sold in the form of "silicon" in lieu of software. Consequently, IP based pricing can be enforced. Furthermore, the present invention enables sales of pre-verified working solutions which have the look and feel of custom solutions. Lastly, the present invention enables information on the sales of ICs programmed using a specific configuration program to be tracked and strategically used to attract support from third party IP suppliers and to manage the contractual terms of business relationships.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
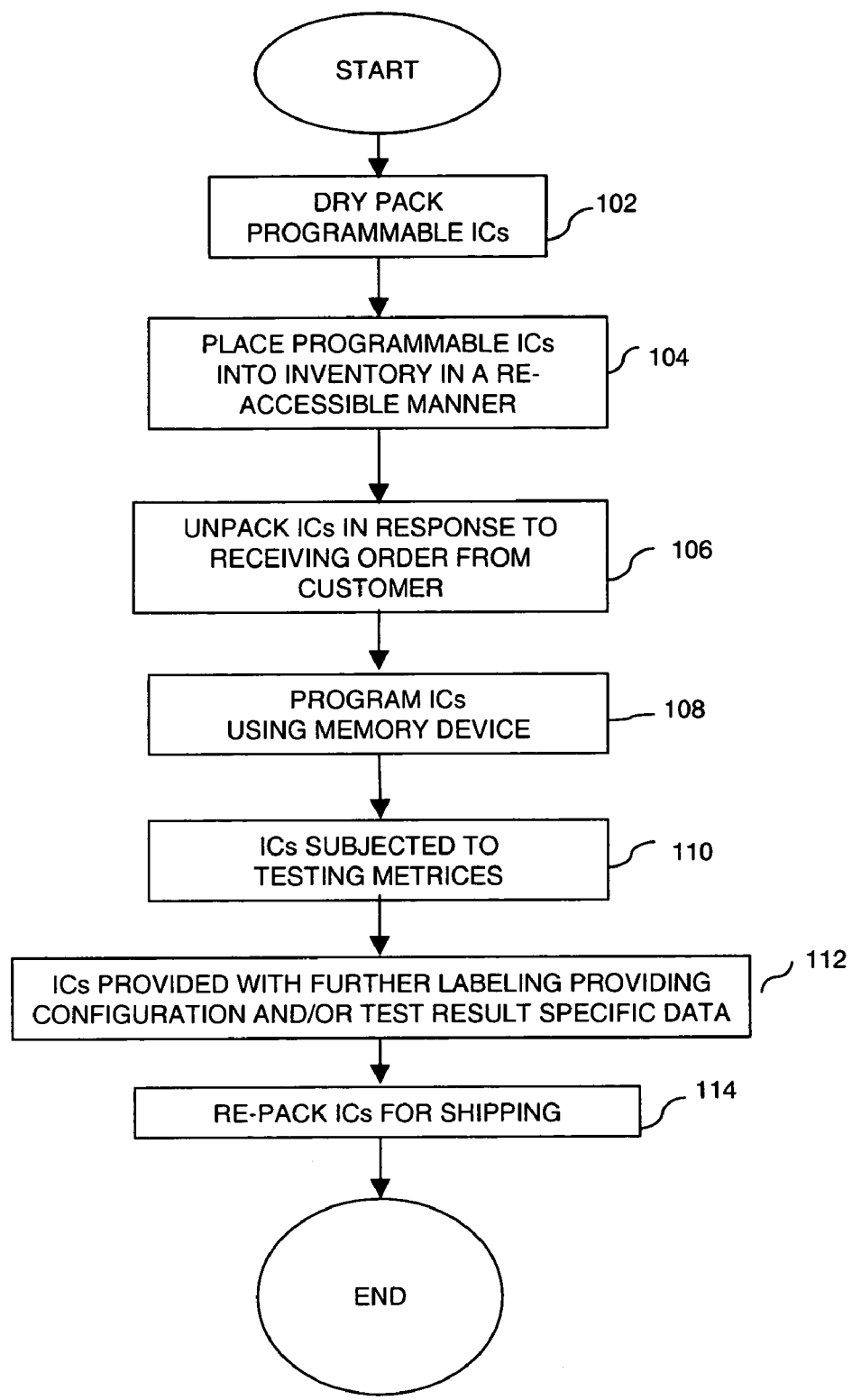
FIG. 1 is a flowchart illustrating a method according to one embodiment of the invention.

Referring now to the drawings, wherein like reference numerals designate identical or corresponding parts throughout the several views, and more particularly to FIG. 1 which is a flowchart illustrating the manufacturing and distribution method steps according to one embodiment of the invention. In step 102, programmable ICs which have been assembled, tested, and marked are processed to remove residual moisture and are packed. According to an embodiment of the invention, the programmable ICs are FPGA devices incorporating in-package program memory. The residual moisture is typically removed through a baking process. After the residual moisture has been removed through the baking process, the FPGAs are stored in hermetically sealed containers. In step 104, the dry packed ICs are placed into inventory such that the inventory is re-accessible in an automated manner. That is, the dry packed ICs are inventoried such that an arbitrary quantity of devices can be subsequently re-accessed and handled by computer controlled devices (e.g., robots) in an automated manner. The IC inventory is maintained in a ready to use state equivalent to standard production shipments. However, the packaging is designed such that the hermetic seal can be opened by automated equipment. For example, according to an embodiment of the invention, the IC devices are placed in a vacuum sealed "Tupperware™" type container allowing the IC devices to be removed from inventory, programmed, retested, and further labeled prior to packing for shipment.

All of the handling associated with steps 106-114 transpires in an environmentally controlled facility such that subsequent production packing meets traditional dry packing standards. In step 106, a subset of the inventoried ICs are unpacked in order to process an order. According to an embodiment of the invention, customers issue orders to fabricate specified volumes of FPGA devices having a certified configuration.

In step 108, the unpacked ICs are programmed, in step 110 they may be subjected to additional functional and/or performance testing metrics, in 112 they may be further labeled with configuration specific and/or test result specific data, and in step 114 the programmed ICs are then conventionally packed for shipment.

Figure 4A:
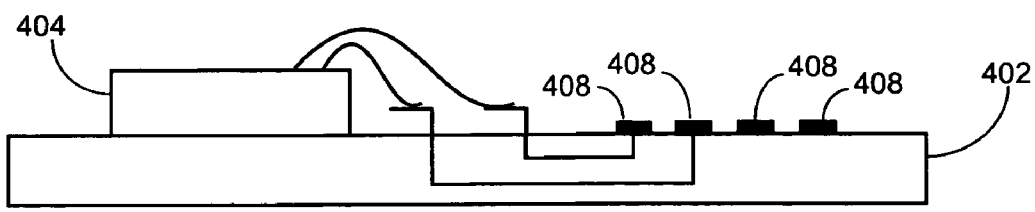
FIGS. 4a and 4b are schematic illustrations of an FPGA-PROM IC package.

In one embodiment of the programming step 108, an unprogrammed FPGA 404 is unpacked and placed on a printed circuit board carrier 402 (see cross-section of FIG. 4a showing the circuit board carrier before the memory device is attached) including contacts 408. When the memory device 406 is attached to the board 402, electrical connections to the contacts 408 include power and ground and all signal connections for programming. A memory device 406 (e.g., a PROM or other programmable memory device such as an EPROM, EEPROM, NAND flash, or NOR flash) is then used to program the FPGA 404.

According to one embodiment of the invention, the memory device 406 will be attached to the printed circuit board carrier 402 during the programming process. The memory device 406 will require wire bonding to the board carrier 402 and will have independently programmed itself with a pre-verified configuration selected by the customer through a process similar to that illustrated in FIG. 1. By way of example, the FPGA can be programmed to function as a system controller or as a dedicated peripheral co-processor configured to encrypt or decrypt data. According to an alternative embodiment of the invention, the memory device 406 is a NAND flash flip chip package having die contacts for mounting onto the circuit board carrier 402. Unlike wire bonding where the actual area required (footprint) for a chip is greater than the size of the chip, the size of a flip chip footprint is equal to its chip area. Consequently, flip chips provide more flexible end packaging. Moreover, a flip-chip is capable of handling a higher number of I/Os because solder bumps can be arranged in an array on the underside of the chip rather than being restricted to the chip's periphery. Thus, there are a greater number of I/Os available to the FPGA which would normally be required for the memory device. Furthermore, since the I/O pins of a flip chip are inaccessible unless you unbond the chip, the configuration data IP stored on the flip-chip is more secure relative to the same data stored on a standard memory device requiring wire bonding.

Figure 4B:
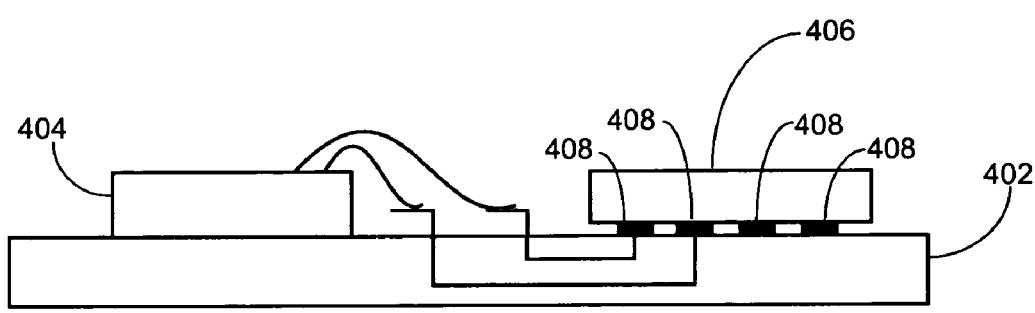

According to a second alternative embodiment, the memory device 406 will be un-programmed, attached to the printed circuit board carrier 402, and connected serially to the FPGA 404 prior to the inventorying process (see cross-section of FIG. 4b). According to this embodiment, the FPGA 404 is partly configured to activate Joint Test Action Group (JTAG) boundary scan features within the FPGA, thus allowing the memory device 406 to be programmed while it is attached to the FPGA. Such an operation can be accomplished by indicating to the FPGA that the memory device 406 is downstream in a daisy chain from the FPGA, as is described at pages 13-25 through 13-32 of the Xilinx Programmable Logic Data Book published September 1996 which is incorporated herein by reference. When the combination of the FPGA and the memory device 406 are again powered up, the memory device 406 configures the FPGA and the combination is ready to operate.

According to a third alternative embodiment, the memory device and the FPGA are co-resident on a single die. The memory device can be non-volatile such as a PROM and the FPGA programmed in the same manner as taught in the second alternative embodiment. Alternatively, the memory device can be a one time programmable anti-fuse. That is, the anti-fuse can be programmed by fusing an internal wire structure. Each opened wire (fused) or closed wire (not fused) represents a logical 0 or 1, respectively. Again, the FPGA is programmed in the same manner as taught in the second alternative embodiment.

Incorporating the step of programming into the standard manufacturing and distribution of programmable ASSPs devices provides numerous benefits. One benefit is improved distribution efficiencies. Shorter order lead times can be satisfied because the devices can be assembled, tested, and marked prior to receiving an order. Other benefits include reduced channel inventory. Channel inventory can be reduced as a result of this invention, because the invention enables a centralized "Drop Shipment" direct to the customer. That is, devices are pulled from inventory, programmed, and shipped entirely on an as needed basis. Thus, enabling daily servicing of accounts practicing aggressive just-in-time inventory management. In addition, improvements and/or derivations to the configuration programs used to program the programmable ASSP devices can be easily integrated into the manufacturing process. And, over time a large number of revisions is easy to support such that older system qualified legacy configurations are easy to sustain in production.

Figure 2:
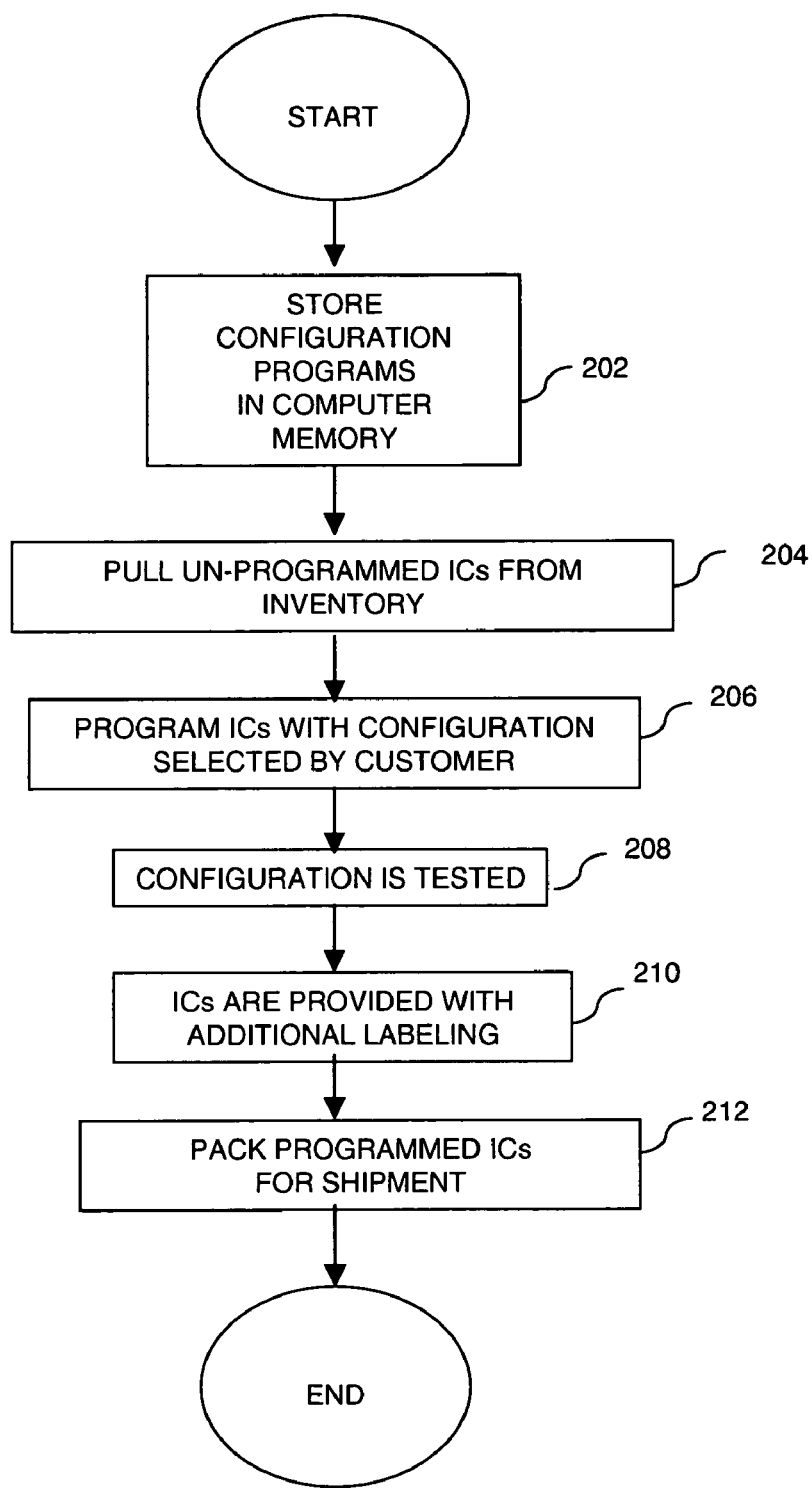
FIG. 2 is a flowchart illustrating a method according to a second embodiment of the invention.

FIG. 2 is a flowchart illustrating computerized method steps for processing an order for programmable ICs according to a second embodiment of the invention. In step 202, computer system 501 (see FIG. 5) stores a plurality of configuration programs used to program the programmable ICs. The configuration programs are provided by customers. According to an embodiment of the invention, ASSP vendors develop and certify configuration programs. In response to an order from a customer, in step 204, the computer system 501 controls the robotic system 525 to pull specified volumes of un-programmed ICs from inventory. In step 206, the computer system controls the robotic system 525 to program the specified volumes of ICs with a configuration selected by the customer. The various ways in which the programming is completed is described herein with reference to FIGS. 1, 4a, and 4b. In step 208, the configuration is tested. One feature of the FPGA, readback, is the ability to read out of the chip the program and also the contents of the internal flip-flops, latches, and memories. During manufacturing, readback allows direct test access to observe and control internal nodes. In step 210, the programmed ICs are provided with additional labeling which reflects the function of the programmed ICS and or test related results. According to an embodiment of the invention, the ASSP vendor is identified (e.g., by illustrating a customer's name and/or logo) in conjunction with indicia reflecting the configuration. Lastly, in step 212, the computer system controls the robotic system to pack the programmed ICs for shipment.

According to an embodiment of the invention, since the FPGAs are programmed with unique configurations under the control of computer system 501, sales of the volumes of FPGAs programmed using a specific configuration program can be tracked by computer system 501. The tracking of specific device configuration shipments is valuable to IP suppliers because it is a viable basis for royalty tracking for secondary suppliers (i.e., IP suppliers supply component IP to an ASSP supplier who incorporates the component into their ASSPs) and for managing volume discount agreements.

Computer controlled processing of an order for programmable ICs creates a number of unique opportunities. Among other things, companies which have traditionally programmed the FPGA devices after receiving them from a manufacturer can now offer ASSP products. That is, the present invention enables these companies to offer programmed devices having a specific function straight from the factory.

Figure 3A:
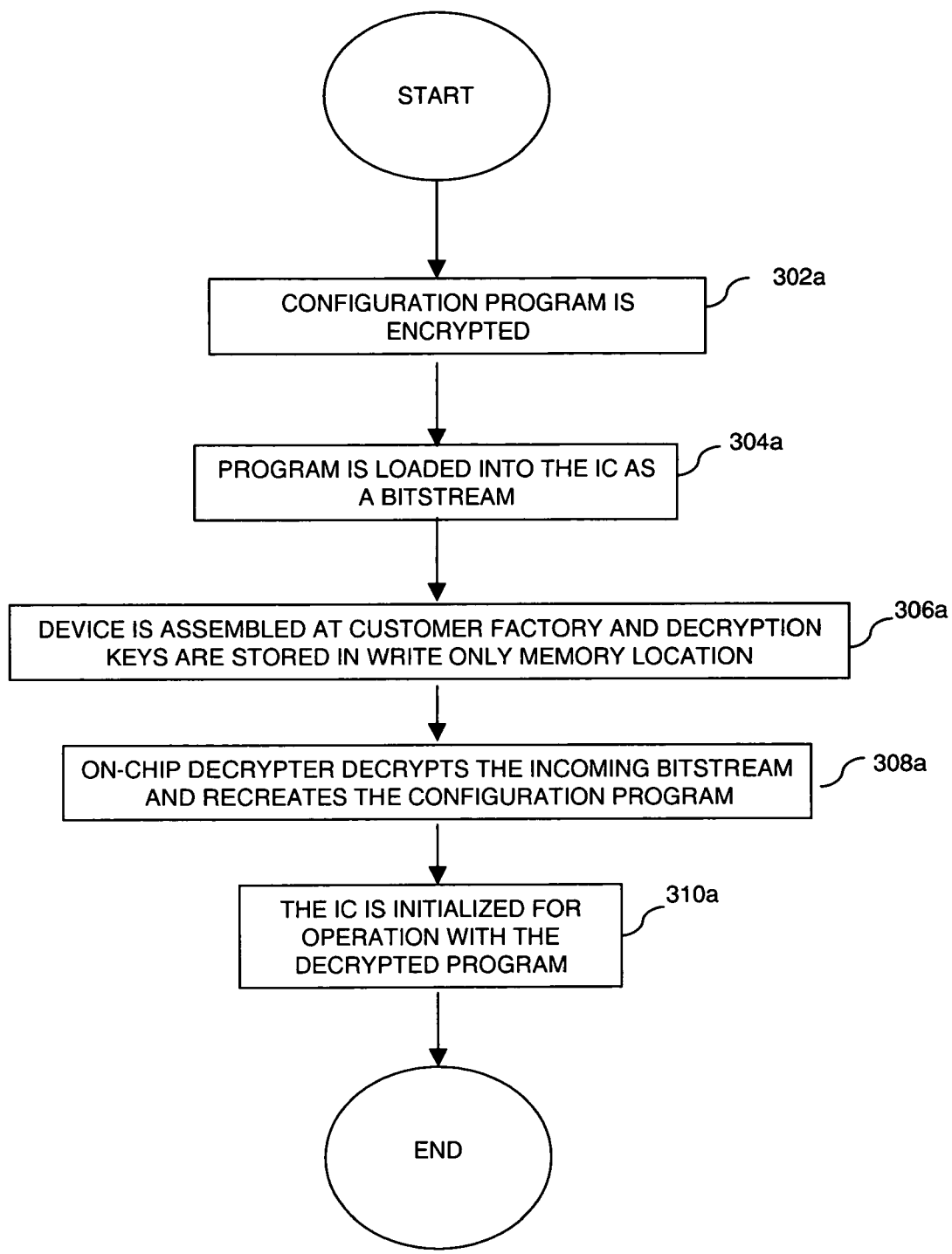
FIGS. 3a, 3b, 3c, and 3d are flowcharts illustrating methods according to a third embodiment of the invention.

FIG. 3a is a flowchart illustrating a process whereby an encrypted configuration program is loaded into an and decrypted by an on-chip decryptor according to a first embodiment. The XILINX Virtex II Platform FPGA Handbook describes such an on chip decryptor (Virtex-II) and a method for using bitstream encryption and is hereby incorporated by reference. In step 302a, the configuration program is encrypted using a symmetric encryption algorithm such as the Data Encryption Standard (DES). Since the algorithm is symmetric, the key to encrypt and decrypt are the same according to this embodiment. The security of the data is kept by keeping the key secret. The invention is not limited to using a symmetric encryption algorithm. Public key systems such as RSA and PGP can also be used to encrypt configuration programs. In step 304a, the encrypted configuration program is loaded into the IC as a bitstream. In step 306a, the device is assembled into a customer system (PCB board) at their factory and the decryption keys are stored in a small externally WRITE ONLY memory location that is backed up by a small externally connected battery. In step 308a, upon in-system initialization, the on-chip decryptor extracts the stored bitstream, decrypts it using the INTERNALLY READABLE keys, and internally recreates the configuration program. Lastly, in step 310a the IC is initialized for operation with the decrypted program. As the key storage memory is not externally accessible, the keys remain secret and the configuration program IP is secure.

Figure 3B:
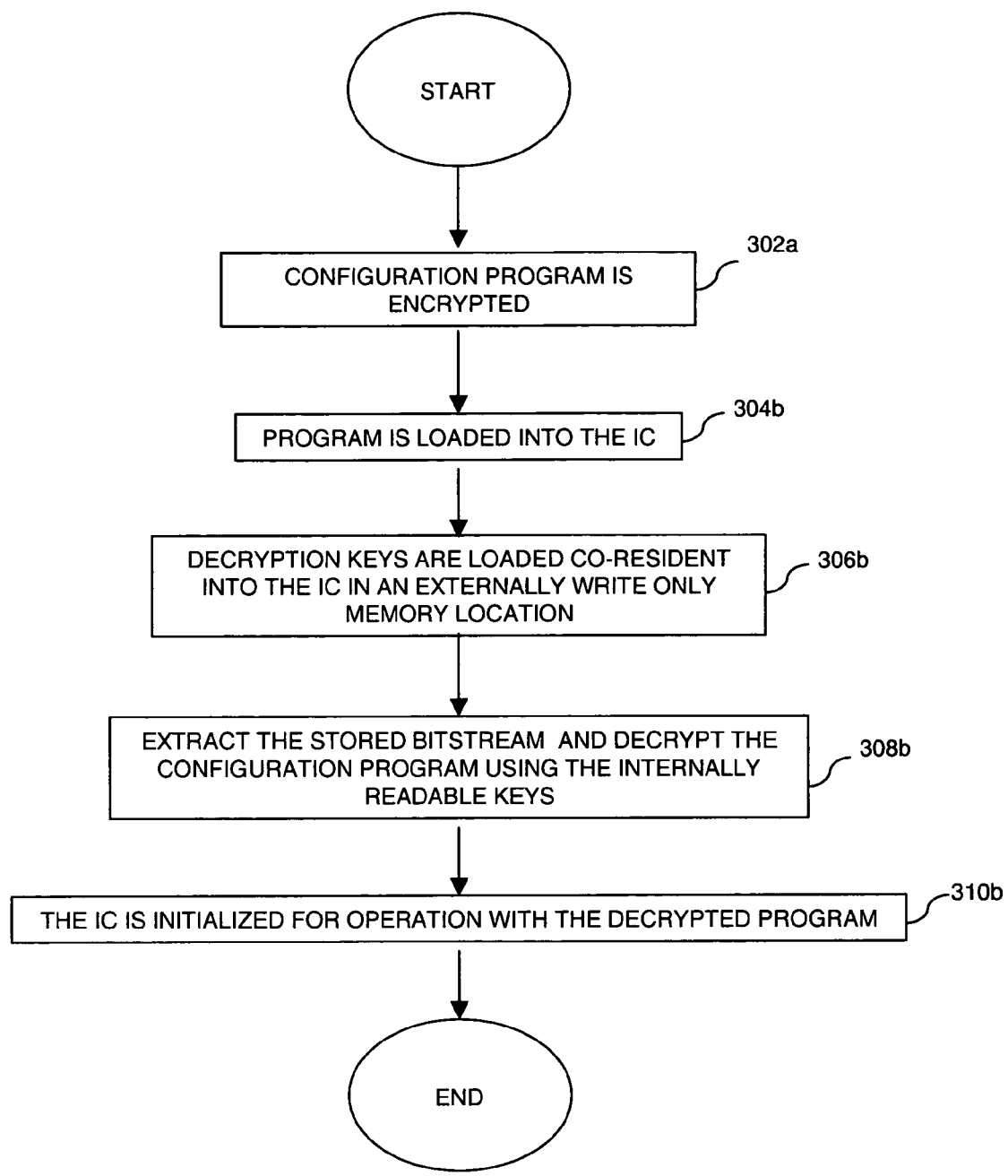

FIG. 3b is a flowchart illustrating a process whereby an encrypted configuration program is loaded into an IC according to a second embodiment. The first step of this embodiment is the same as step 302a described above. In step 304b, the encrypted configuration program is loaded into the IC. In step 306b, the decryption keys are loaded co-resident into the IC in an externally WRITE ONLY memory location. In step 308b, upon in-system initialization, the on-chip decryptor extracts the stored bitstream, decrypts it using the INTERNALLY READABLE keys, and internally recreates the configuration program. Lastly, in step 310b, the IC is initialized for operation with the decrypted program. This embodiment eliminates the need for battery backup and makes the parts truly standalone.

Figure 3C:
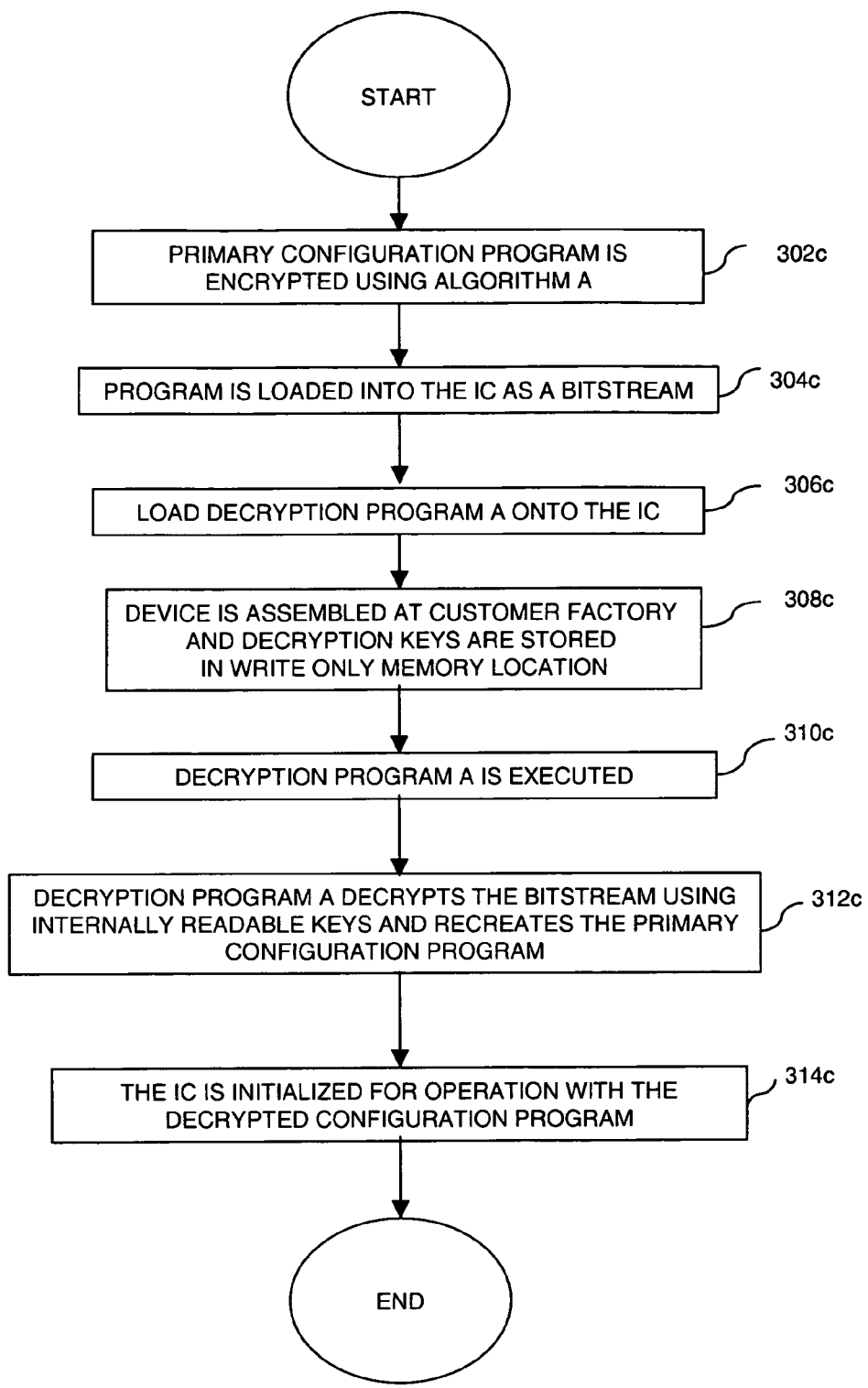

FIG. 3c is a flowchart illustrating a process whereby an encrypted configuration program is loaded into an IC and decrypted by an on-chip decryptor according to a third embodiment. In step 302c, a primary configuration program is encrypted using algorithm A. In step 304c, the encrypted configuration program is loaded into the IC as a bitstream. In step 306c, a decryption program A is also loaded into the IC. Algorithm A and decryption program A can be any commercially available encryption algorithm and decryption program or a proprietary encryption system developed by the customer. In step 308c the device is assembled into a customer system (PCB board) at their factory and the decryption keys are stored in a small externally WRITE ONLY memory location that is backed up by a small externally connected battery. In step 310c, upon in-system initialization, the decryption program A is executed. In step 312c, the decryption program A extracts the stored bitstream, decrypts it using the INTERNALLY READABLE keys, and internally recreates the configuration program. Lastly, in step 314c the IC is initialized for operation with the decrypted program. As the key storage memory is not externally accessible, the keys remain secret and the configuration program IP is secure.

Figure 3D:
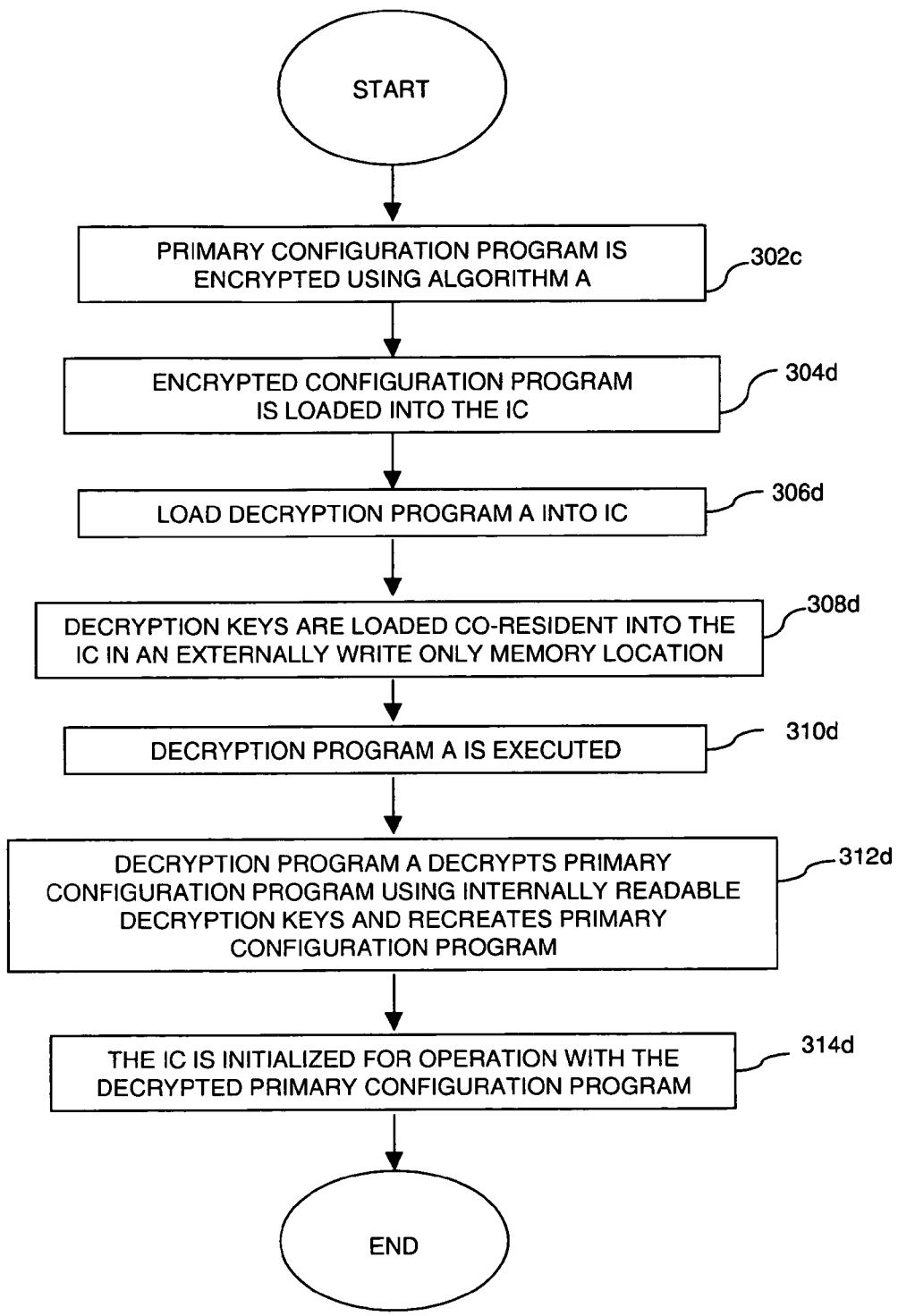

FIG. 3d is a flowchart illustrating a process whereby an encrypted configuration program is loaded into an IC according to a fourth embodiment. The first step of this embodiment is the same as step 302c described above. In step 304d, the encrypted primary configuration program is loaded into the IC. In step 306d, a decryption program A is also loaded into the IC. In step 308d, decryption keys are loaded co-resident into the IC in an externally WRITE ONLY memory location. In step 310d, upon in-system initialization, the decryption program A is executed. In step 312*d*, the decryption program A extracts the stored bitstream, decrypts it using the INTERNALLY READABLE keys, and internally recreates the configuration program. Lastly, in step 314*d* the IC is initialized for operation with the decrypted program. This embodiment eliminates the need for battery backup and makes the parts truly standalone.

All or a portion of the method steps associated with the second embodiment of the invention and FIG. 2 may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 5:
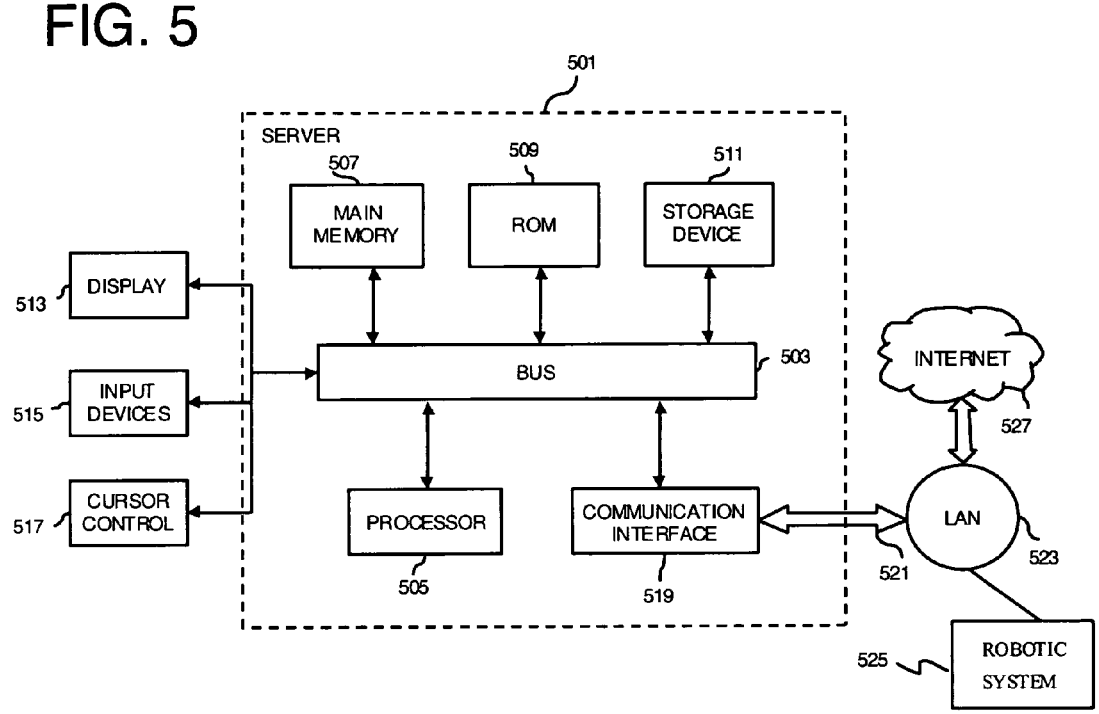
FIG. 5 is a schematic illustration of a computer system for implementing the various embodiments of the invention.

FIG. 5 illustrates a computer system 501 upon which the second embodiment of the present invention may be implemented. Computer system 501 includes a bus 503 or other communications mechanism for communicating information, and a processor 505 coupled with bus 503 for processing the information. Computer system 501 also includes a main memory 507, such as a random access memory (RAM) or other dynamic storage device (e.g., dynamic RAM (DRAM), static RAM (SRAM), synchronous DRAM (SDRAM), flash RAM), coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device (e.g., PROM), erasable PROM (EPROM), and electrically erasable PROM (EEPROM)) coupled to bus 503 for storing static information and instructions for processor 505. A storage device 511, such as a magnetic disk or optical disc, is provided and coupled to bus 503 for storing information and instructions.

The computer system 501 may also include special purpose logic devices (e.g., application specific integrated circuits (ASICs)) or configurable logic devices (e.g., generic array of logic (GAL) or reprogrammable FPGAs. Other removable media devices (e.g., a compact disc, a tape, and a removable magneto-optical media) or fixed, high density media drives, may be added to the computer system 501 using an appropriate device bus (e.g., a small computer system interface (SCSI) bus, an enhanced integrated device electronics (IDE) bus, or an ultra-direct memory access (DMA) bus). The computer system 501 may additionally include a compact disc reader, a compact disc reader-writer unit, or a compact disc juke box, each of which may be connected to the same device bus or another device bus.

Computer system 501 may be coupled via bus 503 to a display 513 (e.g., a cathode ray tube (CRT)), for displaying information to a computer user. The display 513 may be controlled by a display or graphics card. The computer system includes input devices, such as a keyboard 515 and a cursor control 517, for communicating information and command selections to processor 505. The cursor control 517, for example, is a mouse, a trackball, or cursor direction keys for communicating direction information and command selections to processor 505 and for controlling cursor movement on the display 513.

The computer system 501 performs a portion or all of the processing steps of the second embodiment of the present invention in response to processor 505 executing one or more sequences of one or more instructions contained in a memory, such as the main memory 507. Such instructions may be read into the main memory 507 from another computer-readable medium, such as storage device 511. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

As stated above, the system 501 includes at least one computer readable medium or memory programmed according to the teachings of the invention and for containing data structures, tables, records, or other data described herein such as data reflecting the volumes of sales of each uniquely programmed ASSP device and configuration programs provided by the customers. Stored on any one or on a combination of computer readable media, the present invention includes software for controlling the computer system 501, for driving a device or devices, such as the robotic system 525, for implementing the invention, and for enabling the computer system 501 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 505 for execution. A computer readable medium may take many forms, including but not limited to, non-volatile media, volatile media, and transmission media. Non-volatile media includes, for example, optical, magnetic disks, and magneto-optical disks, such as storage device 511. Volatile media includes dynamic memory, such as main memory 507. Transmission media forming at least a portion of a bus 503 include coaxial cables, copper wire and fiber optics. Transmission media also may also take the form of air or wave guides for passing acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions by a processor 505 for execution. For example, the instructions may initially be carried on a magnetic disk of a remote computer. The remote computer can load the instructions for implementing all or a portion of the present invention remotely into a dynamic memory and send the instructions over a communications interface (e.g., telephone line using a modem). A modem local to computer system 501 may receive the data (e.g., configuration programs) on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communications interface 519 coupled to bus 503. Communications interface 519 provides a two-way data communication coupling to a network link 521 that is connected to a local network. For example, communications interface 519 may be a network interface card to attach to any packet switched local area network (LAN). As another example, communications interface 519 may be an asymmetrical digital subscriber line (ADSL) card, an integrated services digital network (ISDN) card, or a modem to provide a data communication connection to a corresponding type of telephone line. Wireless links may also be implemented. In any such implementation, communications interface 519 sends and receives electrical, electromagnetic or optical signals that carry digital data streams representing various types of information.

Network link 521 typically provides data communication through one or more networks to other data devices. For example, network link 521 may provide a connection through LAN 523 to the robotic system 525 or to data equipment operated by a service provider, which provides data communication services through an Internet Protocol (IP) network 527 or any other suitable network using any known protocol (e.g., IPX). LAN 523 and IP network 527 both use electrical, electromagnetic or optical signals that carry digital data streams. The signals through the various networks and the signals on network link 521 and through communications interface 519, which carry the digital data to and from computer system 501, are exemplary forms of carrier waves transporting the information. Computer system 501 can transmit notifications and receive data, including program code, through the network(s), network link 521 and communications interface 519.

Obviously, numerous modifications and variations of the present invention are possible in light of the above teachings. It is therefore to be understood that within the scope of the appended claims, the invention may be practiced otherwise than as specifically described herein.

What is claimed is:

1. A computer controlled method for processing an order for programmable integrated circuits (ICs), comprising the steps of:
   receiving a plurality of configurations from a plurality of customers by a vendor of the programmable integrated circuits;
   storing the plurality of configurations, the storing being performed by the vendor;
   pulling specified volumes of un-programmed ICs from inventory by the vendor in response to an order from a first customer of the plurality of customers;
   encrypting, by the vendor using an encryption system provided by the first customer, one of the plurality of configurations selected by the first customer, whereby an encrypted configuration is generated;
   loading by the vendor, the encrypted configuration into the specified volumes of ICs;
   loading by the vendor, a decryption program into the specified volumes of ICs, wherein the decryption program is provided by the first customer; and
   packing the programmed ICs for shipment from the vendor to the first customer.

2. The method according to claim 1, wherein the ICs comprise field programmable gate arrays (FPGAs) and the step of programming comprises the steps of:
   attaching a memory device to the FPGAs; and
   programming the FPGAs using the selected configuration stored in the memory device.

3. The method according to claim 1, wherein the ICs each comprise a field programmable gate array (FPGA) and a memory device connected to the FPGA co-resident in one package and the step of programming comprises the step of:
   programming the memory device while it is connected to the FPGA; and
   powering up the FPGA and the memory device in order that the memory device configures the FPGA.

4. The method according to claim 1, wherein the ICs each comprise a field programmable gate array (FPGA) and a memory device connected to the FPGA co-resident on a common die and the step of programming comprises the step of:
   programming the memory device while it is connected to the FPGA; and
   powering up the FPGA and the memory device in order that the memory device configures the FPGA.

5. The method according to claim 2, wherein the memory device is selected from a group consisting of a programmable read only memory (PROM), NAND flash, NOR FLASH, erasable PROM, and electrically erasable PROM.

6. The method according to claim 3, wherein the memory device is selected from a group consisting of a programmable read only memory (PROM), NAND flash, NOR FLASH, erasable PROM, and electrically erasable PROM.

7. The method according to claim 4, wherein the memory device is selected from a group consisting of a programmable read only memory (PROM), NAND flash, NOR FLASH, erasable PROM, and electrically erasable PROM.

8. The method according to claim 4, wherein the memory device is an anti-fuse.

9. The method according to claim 1, further comprising the step of testing the programmed ICs.

10. The method according to claim 1, further comprising the step of labeling the programmed ICs to reflect the selected configuration.

11. The method according to claim 1, further comprising tracking sales of the volumes of ICs programmed using the selected configuration.

12. The method according to claim 1, wherein the selected configuration is developed by the customer.

13. The method according to claim 10, wherein the step of labeling comprises marking the programmed ICs with at least one of a customer name and a customer logo.

14. The method of claim 1, further comprising:
   for each of the specified volumes of ICs received by the first customer, storing by the first customer, a decryption key in a memory that is coupled to the IC, wherein the memory and IC reside on a device, and the memory is inaccessible for reading external to the device; and
   for each of the specified volumes of ICs received by the first customer, executing the decryption program, wherein the decryption program reads the key, decrypts the encrypted configuration data into decrypted configuration data, and initializes the IC with the decrypted configuration data.

* * * * *